3,169,104
PRODUCTION OF POLYHALOALKYL
SULFENYL CHLORIDES
Harry A. Pacini, Richmond, and Attila E. Pavlath and William M. Foley, Jr., Berkeley, Calif., assignors to Stauffer Chemical Company, New York, N.Y., a corporation of Delaware
No Drawing. Filed Nov. 24, 1961, Ser. No. 154,810
4 Claims. (Cl. 204—158)

This invention relates to a process for producing polyhaloalkyl sulfenyl chlorides. More particularly, this invention relates to the preparation of polyhaloalkyl sulfenyl chlorides and their corresponding sulfides by reacting sulfur dichloride with a polyhalo-olefins.

This addition reaction of the present invention is particularly adaptable to halogenated ethylenes.

Among the objects of the present invention is to provide a process for producing polyhaloalkyl sulfenyl chlorides and the corresponding sulfides which is conducted at much lower pressures and temperatures than the known processes of the prior art.

These and other objects of the present invention will be apparent from the following description.

It is well known that while hydrocarbon olefins will undergo a series of addition reactions with a wide variety of reagents, halogenated olefins, especially the higher halogenated ones, exhibit little or no reactivity under similar reaction conditions. The addition of sulfur dichloride to ethylene can be accomplished simply by bubbling the olefin into the solution of sulfur dichloride. Under the same reaction conditions, tetrafluoroethylene, for example, does not react with the sulfur dichloride. To successfully react tetrafluoroethylene with sulfur dichloride, the prior art states that a pressure of 2000 p.s.i. and a temperature between 100 and 150° C. is required.

On the other hand, by using the process of the present invention the addition reaction between sulfur dichloride and halogenated olefins, including tetrafluoroethylene, can be accomplished at atmospheric pressure and at temperatures up to 45° C.

According to the method of the present invention sulfur dichloride and halogenated olefins are brought into contact with one another and irradiated to effect the desired reaction. The reaction may take place in the liquid or gas phase, but the gas phase is preferred due to the lower contact times necessary.

The products of such reactions include the corresponding haloalkyl sulfenyl chloride and sulfides. For example, if $CF_2=CFCl$ is reacted with sulfur dichloride, the reaction products include $CF_2ClCFClSCl$, $$CFCl_2CF_2SCl$$

$CF_2ClCFCl_2—S—Cl_2FCCIF_2C$, and $$CFCl_2CF_2—S—F_2CCl_2FC$$

The formation of a given product can be optimized by varying the ratio of reactants and varying the contact time as is obvious to those skilled in the art.

One difficulty arises in the present process and that is sulfur dichloride is liable to decompose under the reaction conditions. This problem can be overcome by adding a sufficient amount of phosphorus trichloride to the sulfur dichloride to inhibit decomposition. For this purpose, 4 to 5% phosphorus trichloride almost completely inhibits decomposition.

The following examples are merely descriptive of the present invention and are not to be considered as limitations thereon.

*Example I*

Through a mixture of 35 grams of sulfur dichloride with 4% phosphorus trichloride, vinylidene fluoride was bubbled at the rate of 100–110 cc./min. The sulfur dichloride-phosphorus trichloride mixture was at 45–50° C. The mixed gases were then allowed to pass through a vertical tube under ultraviolet radiation with a contact time of 15 min. Distillation of the material collected at the bottom of the vertical tube gave the following fractions:

| | G. |
|---|---|
| I. B.P. 23–126° | 9.6 |
| II. B.P. 41–43°/50 mm. | 10.0 |
| III. B.P. 74°/48 mm. | 5.5 |
| IV. B.P. 80°/48 mm. | 11.0 |

Gas chromatographic analysis shows II to consist of two isomers which have very nearly the same boiling points; the ratio has been established at 2:1. Analytical information indicated II was essentially a pure mixture of $R_fSCl$, where $R_f$ is  or . Chlorine found 44.8%; calc. 42.5%; sulfur found 19.27%, calc. 19.15%.

Fractions III and IV were identified as two of the possible three sulfides which could form.

Supporting this is the analytical data for the sulfide 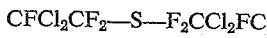 chlorine found 31.09 and 31.07%, calc. 30.6%; sulfur found 14.54 and 14.14%, calc. 13.85%. The formation of the third sulfide was noted by gas chromatography.

*Example II*

A similar technique, as used in Example I, was used in the case of 1-chloro-1,2,2-trifluoroethylene. To 105 g. (1 mol.) sulfur dichloride was added 5 gm. phosphorus trichloride. Contact time in the reaction chamber was 15 minutes under ultraviolet radiation.

Distillation of the product gave one fraction boiling at 36° C./36 mm., $n_D^{23}$ 1.4365. Its purity was analyzed by gas chromatography. On the basis of the analytical results (Cl, percent: calc. 48.5, found 47.97; S, percent: calc. 14.6, found 14.3) it is the sulfenyl chlorides $$(C_2Cl_3F_3S)$$

*Example III*

Using the apparatus described previously, tetrafluoroethylene was bubbled through a mixture of sulfur dichloride and phosphorus trichloride at the rate of .1 mole/hour. The sulfur dichloride was at 45–50° C. Eleven grams of material was obtained during one hour. Distillation gave 95% 2-chloro-1,1,2,2-tetrafluoroethyl sulfenyl chloride, B.P. 65–67° C., $n_D^{22}$ 1.3810 (lit. 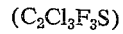 1.3890).

*Example IV*

Vinyl fluoride was passed through a mixture of sulfur dichloride (1 mol.) and 5 gm. phosphorus pentachloride in the same apparatus described previously.

In the product obtained, the composition was found to be 59.4% mixed sulfenyl chlorides, 28.3% mixed sulfides and the remainder made up as sulfur dichloride, sulfur monochloride and phosphorus trichloride. The boiling point of the sulfenyl chloride was found to be 42–48°/45 mm. and the sulfides from 55–56°/45 mm.

*Example V*

Hexafluoropropylene was passed through 1 mole sulfur dichloride with 5% phosphorus trichloride added in the same apparatus described previously, with a contact time of seven minutes. The combined crude products (14.5 g.) were made up as 85% $R_fSCl$ (where $R_f$ is either $CF_3CFClCF_2$ or $CF_3CFCF_2Cl$), B.P. 93–94° C. at 760 mm., $n_D^{23}$ 1.3755. Analytical data: chlorine found 27.2, calc. 28.1; sulfur found 13.95, calc. 12.7. A small amount (6.4%) of a sulfide was found.

Example VI 103.0 grams of sulfur chloride and 97.0 grams of 1,2-dichloroethylene were mixed and placed in a dropping funnel fitted at the upper end of a vycor tube. The mixture was added dropwise to the tube and was irradiated by a mercury vapor lamp as it ran down the walls of the tube.

The material collected at the bottom of the vertical tube contained $C_2H_2Cl_3SCl$ as shown by analytical data. Cl, percent: calculated 71.00; found 70.1; S, percent: calculated 16.00; found 16.06.

The products of this invention are useful as modifiers for diene polymerizations, rubber chemicals, insecticides, and as intermediates for the preparation of polysulfide elastomers and for the manufacture of chlorofluoroethane-sulfonic acid and chlorofluoroethyl mercaptans and the like.

As many apparently widely different embodiments of this invention may be made without departing from the spirit and scope thereof, it should be understood that we do not limit ourselves to the hereinbefore mentioned specific embodiments except as defined in the appended claims.

We claim:

1. A process for preparing saturated polyhaloalkyl sulfenyl chlorides and sulfides comprising contacting sulfur dichloride and a halogenated olefin in the presence of ultraviolet light.

2. A process for preparing saturated polyhaloalkyl sulfenyl chlorides and sulfides comprising contacting sulfur dichloride, containing an amount of phosphorus trichloride sufficient to inhibit decomposition thereof, and a halogenated olefin in the presence of ultraviolet light.

3. A process for preparing saturated polyhaloalkyl sulfenyl chlorides and sulfides comprising contacting sulfur dichloride and a halogenated olefin in the presence of ultraviolet light at atmospheric pressure.

4. A process for preparing saturated polyhaloalkyl sulfenyl chlorides and sulfides comprising contacting sulfur dichloride, containing an amount of phosphorus trichloride sufficient to inhibit decomposition thereof, and a halogenated olefin in the presence of ultraviolet light at atmospheric pressure.

References Cited in the file of this patent

UNITED STATES PATENTS

| | | |
|---|---|---|
| 2,451,411 | Raasch | Oct. 12, 1948 |
| 3,099,688 | Krespan | July 30, 1963 |

OTHER REFERENCES

Kharasch et al.: Journal of American Chemical Society (1947), vol. 69, page 1100.